② United States Patent [11] 3,601,710

[72] Inventor Michael A. Morra
Freehold, N.J.
[21] Appl. No. 852,309
[22] Filed Aug. 22, 1969
[45] Patented Aug. 24, 1971
[73] Assignee Bell Telephone Laboratories Incorporated
Murray Hill, N.J.

[54] DIGITAL DETECTOR FOR BINARY FSK SIGNALING
6 Claims, 10 Drawing Figs.

[52] U.S. Cl. .......... 329/104, 329/112
[51] Int. Cl. .......... H03k 9/00
[50] Field of Search .......... 178/66; 325/320, 30; 329/112, 126, 128, 134, 104

[56] References Cited

UNITED STATES PATENTS

| | | | |
|---|---|---|---|
| 2,713,677 | 7/1955 | Scott et al. .......... | 329/128 |
| 3,437,932 | 4/1969 | Malakoff .......... | 325/320 |
| 3,508,136 | 4/1970 | Danielsen et al. .......... | 178/66 X |

*Primary Examiner*—Roy Lake
*Assistant Examiner*—Lawrence J. Dahl
*Attorneys*—R. J. Guenther and Kenneth B. Hamlin

ABSTRACT: A digital detector for a synchronous, low bit-rate signaling systems comprises monostable timing devices and logic components to replace the low-pass filter and slicer circuits of the conventional zero-crossing detector. The detection scheme is dependent upon a comparison of zero-crossing intervals and an optimum threshold interval chosen to minimize synchronous distortion. The maximum theoretical bit rate is equal to the sum of the mark and space frequencies, corresponding to 50 percent peak synchronous distortion.

INVENTOR
BY M. A. MORRA

J. P. Kearns
ATTORNEY

DIGITAL DETECTOR FOR BINARY FSK SIGNALING

FIELD OF THE INVENTION

This invention relates to frequency-shift demodulating circuits and particularly to circuits of this type which employ digital logic components.

BACKGROUND OF THE INVENTION

Data transmission in the voice-frequency band over the switched telephone network is increasing in importance. As the need for such transmission increases there will be greater demand for smaller and less expensive modulation and demodulation equipment.

With the advent of large scale integration it has become possible to perform more logic functions in a smaller area. Also, a modest cost is assigned to elaborate circuitry. Thus, many tasks currently assigned to linear circuits can be reassigned to more sophisticated digital processing techniques. Data transmission via frequency-shift keyed (FSK) signals lends itself to digital processing when zero-crossing detectors are used.

One well-known demodulating circuit is that using a band-pass filter, limiter, differentiator, full-wave rectifier, low-pass filter, and slicer circuits. While this demodulating circuit is suitable for relatively high bit rates, its components are relatively expensive. Thus, substitution of less expensive and more reliable digital integrated circuits may be advantageous even though lower bit rates result.

One approach to using digital detection techniques is disclosed in U.S. Pat. No. 3,233,181 entitled "Frequency Shift Signal Demodulator" issued to R. W. Calfee on Feb. 1, 1966. The circuit therein compares a signal generated at the commencement of the first half-cycle of the incoming FSK wave with a signal generated at the commencement of the second half-cycle of the incoming FSK wave. An analysis of the Calfee detection scheme reveals that the maximum allowable bit rate is equal numerically to the lower of the two modulated frequencies, corresponding to 50 percent peak synchronous distortion. As is well known, synchronous distortion is a measure of dissymmetry in the demodulated output data.

It is an object of this invention to provide a new and improved signal demodulator for deriving digital information from a frequency-shift modulated wave.

It is another object of this invention to replace the low-pass filter and slicer circuits of the conventional zero-crossing detector with a simple digital detector.

It is a further object of this invention to provide a small and inexpensive digital detector suitable for low bit rates.

SUMMARY OF THE INVENTION

According to the present invention, a digital detector of continuous phase binary FSK signals comprises means responsive to unidirectional pulses coincident with zero crossings of either sense of the incoming FSK wave for producing either of two complementary binary digits as a function of a comparison between the zero-crossing intervals and an optimum threshold interval defined as the reciprocal of the sum of the two FSK frequencies.

According to a preferred embodiment of the invention, a digital detector of continuous phase binary FSK signals comprises monostable timing means such as first and second monopulsers, an inverter, gating means such as first and second AND gates, and bistable means such as a flip-flop. AND gates and flip-flops are well-known logic components of the prior art. A series of unidirectional pulses corresponding to the zero crossings of the FSK wave triggers the first monopulser and serves as an enabling input to the first AND gate. On timing out, the first monopulser triggers the second monopulser and enables the second AND gate. The direct output of the second monopulser serves as the second input to the second AND gate while the inverted output of the second monopulser serves as the second input to the first AND gate. Finally, the outputs of the first and second AND gates which correspond to the detected high and low frequencies, serve respectively as the set and reset inputs to the flip-flop. Thus, the output of the flip-flop is the demodulated digital data.

It is a feature of this invention that the peak synchronous distortion is a minimum for any given bit rate.

BRIEF DESCRIPTION OF THE DRAWINGS

The above and other objects, features, and advantages of this invention will be better appreciated by a consideration of the following detailed description and the drawing in which.

DETAILED DESCRIPTION

Figures 1A, 1B:
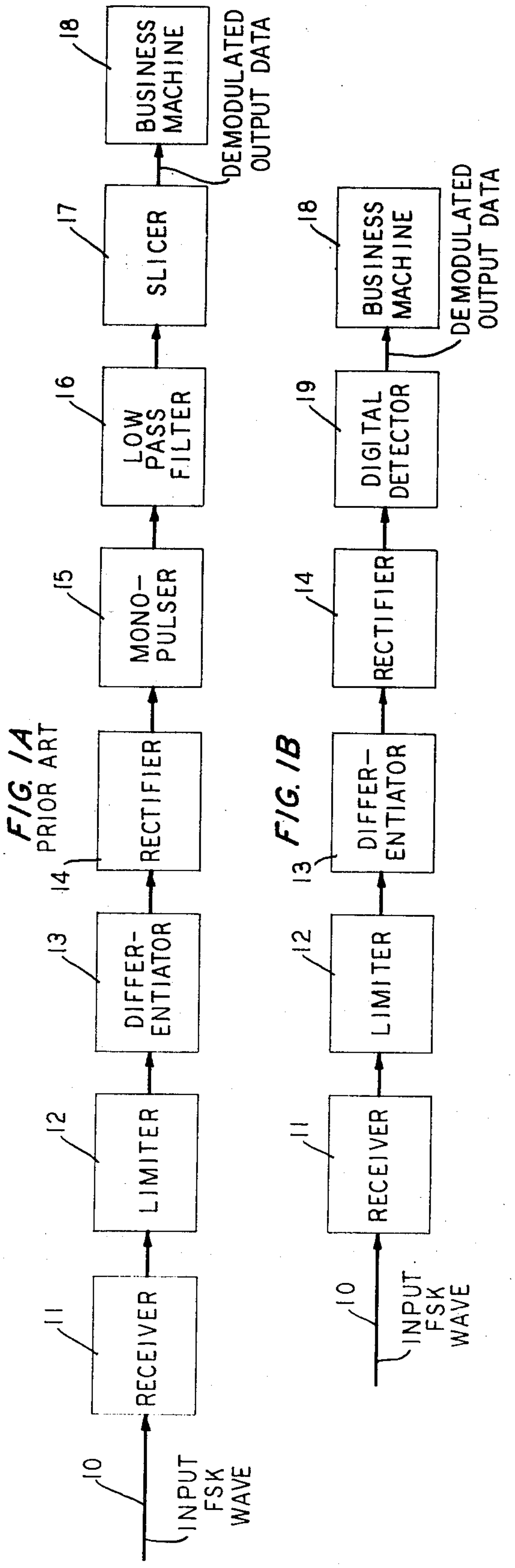
FIGS. 1A and 1B are block diagram representations of demodulator circuits according to the prior art and the invention herein, respectively.

FIG. 1A shows a block diagram representation of a zero-crossing type demodulator of the prior art. The frequency-shift signal encoding the transmitted data is received over transmission line 10 by receiver 11. Receiver 11 may contain a band-pass filter to reduce the effects of noise outside the data band and an equalizer to correct for any delay or amplitude distortion imparted by the transmission line. Next, the signal is limited in limiter 12 to obtain sharp transitions of the received signal in square wave form. The limiter output is differentiated in differentiator 13 yielding alternate positive and negative pulses at the respective positive-going and negative-going transitions in the square wave output of limiter 12. These pulses are then rectified in rectifier 14 to yield a series of unidirectional pulses corresponding to the zero crossings of the received wave. The rectified unidirectional pulses trigger a monostable device such as monopulser 15 which generates a pulse of uniform duration for each unidirectional pulse. The monopulser output is integrated in low-pass filter 16 to obtain a direct current signal of varying level according to a given amplitude-frequency characteristic. The output of the filter should vary linearly with the frequency of the signal received on line 10. The output of low-pass filter 16 is next applied to slicer 17 which changes state as the signal level crosses about halfway between the marking and spacing voltages of the amplitude-frequency characteristic. Finally, the output of slicer 17 serves as the input digital data to business machine 18.

FIG. 1B shows a block diagram representation of a demodulator circuit containing a digital detector according to this invention. The demodulator of FIG. 1B is similar to the conventional demodulator of FIG. 1A except that low-pass filter 16 and slicer 17 have been replaced by digital detector 19. As explained above, elements 12, 13, and 14 generate a series of unidirectional pulses corresponding to the zero crossings of the input FSK wave.

Figures 2A, 2B:
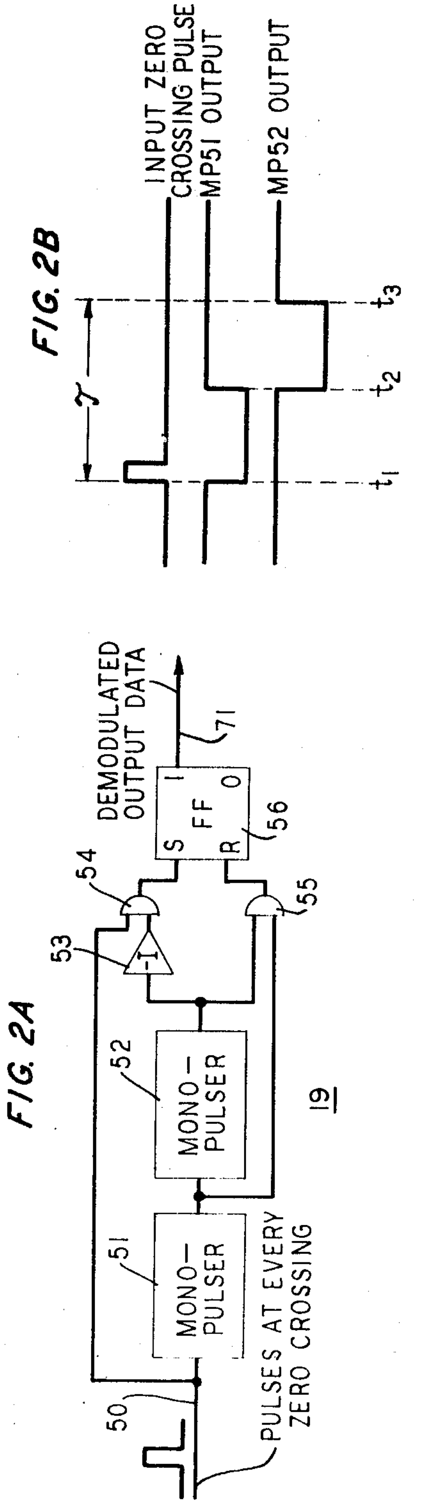
FIG. 2A is a block diagram representation of a preferred embodiment of the digital detector according to this invention.
FIG. 2B is its associated timing diagram.

FIG. 2A shows a digital detector according to this invention comprising monostable timing means such as normally ON monopulsers 51 and and 52, inverter 53, gating means such as AND gates 54 and 55, and bistable means such as flip-flop 56. The AND gates and the flip-flop are well-known logic components. The positive input pulses to monopulser 51 and AND gate 54 are provided by rectifier 14. Reference to FIG. 2B, the timing diagram for monopulsers 51 and 52, will clarify the operation of digital detector 19. It is apparent that monopulsers 51 and 52 generate pulses of uniform duration in response to their respective input signals.

As noted above, the input to monopulser 51 at lead 50 is a positive-going pulse at every zero crossing of the input FSK wave. For purposes of an example, assume that the input FSK frequencies are 1,300 and 2,100 Hz. The lower of the two modulated frequencies is designated $f_L$ and the higher is designated $f_H$. Also, let $f_H$ represent a mark or binary "1" and let $f_L$ represent a space or binary "0." Now, for the 1,300 Hz. sine wave the zero crossings occur at intervals of $1/2f_L$=385 microseconds. Similarly, for the 2,100 Hz. sine wave the zero crossings occur at intervals of $1/2f_H$=238 microseconds.

A feature of this detection scheme is the utilization of an optimum threshold interval $\tau$ which results in minimum peak synchronous distortion for any given bit rate. It will be shown that the value of $\tau$ is given by $$\tau=1/f_H+f_L) \qquad (1)$$

and is equal to 294 microseconds for this example. The detection scheme is basically the result of a comparison wherein: (a) $f_H$ is chosen if the interval between successive zero crossings is less than $\tau$ or 294 microseconds, (b) $f_L$ is chosen if the interval between successive zero crossings is greater than $\tau$ or 294 microseconds, and (c) $f_H$ or $f_L$ is randomly chosen in case of equality.

Referring again to FIGS. 2A and 2B, at time $t_1$ a positive-going pulse, representative of a zero crossing, appears on lead 50 and triggers monopulser 51 off. At time $t_2$ monopulser 51 goes back on thereby triggering monopulser 52 off. The interval between $t_1$ and $t_2$ is chosen less than the minimum possible interval between successive zero crossings, which for this case is 238 microseconds. At time $t_3$ monopulser 52 goes back on. The interval between $t_1$ and $t_3$ is the optimum threshold interval $\tau$ or 294 microseconds. As mentioned above, the interval between $t_1$ and $t_2$ is any value less than 238 microseconds. However, for simplicity of design, the interval between $t_1$ and $t_2$ can be made equal to the interval between $t_2$ and $t_3$.

Now, if a second zero crossing occurs during the interval between $t_2$ and $t_3$ it is said that $f_H$ is being received and flip-flop 56 is set. However, if both monopulsers 51 and 52 go back on before the next zero crossing, then it is said that $f_L$ is being received and flip-flop 56 is reset. The demodulated output data appears on lead 71. Therefore, elements 51 through 56, in combination, compare successive zero-crossing intervals with the optimum threshold interval to produce complementary data bits. For instance, a zero-crossing interval less than the optimum threshold interval may represent a mark or binary "1" and a zero-crossing interval greater than the optimum threshold interval may represent a space or binary "0."

Note that in this detection scheme $\tau$ seconds after the previous zero crossing a decision is made as to which frequency $f_H$ or $f_L$ is being received. The selection of an optimum $\tau$ is based on a minimization of the worst case synchronous distortion.

Figure 3A:
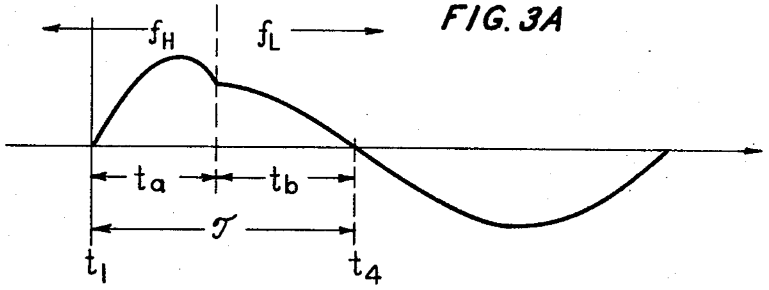
FIG. 3A is a waveform diagram of an ideal continuous phase frequency-shift keyed (FSK) signal.

Consider the ideal continuous phase binary FSK signal of FIG. 3A wherein zero crossings occur at times $t_1$ and $t_4=t_a+t_b$ and a change in frequency takes place at time $t_a$. If the interval between successive zero crossings is exactly $\tau$, as shown in FIG. 3A, then at time $t_4$ it is not known which frequency $f_H$ or $f_L$ is being received. This condition corresponds to decision (c) above. Consequently $t_b$ is the minimum interval after a change in frequency has taken place from which it can be concluded that a transition from $f_H$ to $f_L$ has occurred. If the zero crossings occur in a time just less than $\tau$, then it takes approximately $t_b+\tau$ seconds to conclude that a transition from $f_H$ to $f_L$ has occurred. A similar discussion applies for transitions from $f_L$ to $f_H$.

Now, expressions for $t_a$ and $t_b$ can be obtained from the following:

$$2\pi f_H t_a+2\pi f_L t_b=\pi\ , \qquad (2)$$

since the FSK wave is assumed to be of continuous phase, and $$t_a+t_b=\tau. \qquad (3)$$

The use of standard mathematical techniques for the solution of simultaneous linear equations yields the following expressions for $t_a$ and $t_b$:

$$t_a=\frac{1-2f_L\tau}{2(f_H-f_L)} \qquad (4)$$

$$t_b=\frac{2f_H\tau-1}{2(f_H-f_L)} \qquad (5)$$

Figure 3B:
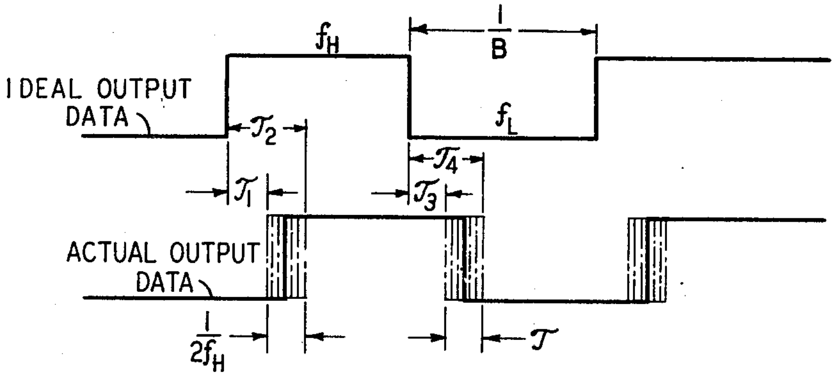
FIG. 3B shows a comparison of an ideal output signal with the actual output signal indicating their time relations.

FIG. 3B compares the ideal output signal with an actual output signal. The quantities depicted therein are defined as follows:

$B$ = bit rate, $\tau_1$ = minimum time required to detect an $f_L$ to $f_H$ frequency transition, $\tau_2$ = maximum time required to detect an $f_L$ to $f_H$ transition, $\tau_3$ = minimum time required to detect an $f_H$ to $f_L$ transition, $\tau_4$ = maximum time required to detect an $f_H$ to $f_L$ transition.

From the previous discussion with respect to equations (4) and (5) and the above definitions it can be concluded that:

$$\tau_1=t_a=\frac{1-2f_L\tau}{2(f_H-f_L)} \qquad (6)$$

$$\tau_2=t_a+\frac{1}{2f_H}=\frac{1-2f_L\tau}{2(f_H-f_L)}+\frac{1}{2f_H} \qquad (7)$$

$$\tau_3=t_b=\frac{2f_H\tau-1}{2(f_H-f_L)} \qquad (8)$$

$$\tau_4=t_b+\tau=\frac{2f_H\tau-1}{2(f_H-f_L)}+\tau \qquad (9)$$

In order to calculate $\tau$, a further expression for synchronous distortion must be determined. Inherent in this method of demodulation there exists a fixed amount of synchronous distortion. Such distortion shows up as jitter in the digital eye pattern. This is illustrated in FIG. 3B. In the worst case the synchronous distortion D is equal to one-half the product of the maximum jitter J and the bit rate B. Thus, $$D=J\ B/2. \qquad (10)$$

An effective jitter $J_e$ must be defined since the detected output signal is nonsymmetrical. For this case, the amount of dissymmetry is added to the actual decision jitter. The worst case effective jitter is given by the maximum of the following two possible cases:

$$Je_1=\frac{1}{2f_H}+|\tau_3-\tau_1| \qquad (11)$$

$$Je_2=\tau+|\tau_3-\tau_1| \qquad (12)$$

Since $\tau>1/2f_H$, equation (11) is eliminated and the problem becomes one of minimizing $$D=B/2(\tau+|\tau_3-\tau_1|). \qquad (13)$$

Using equations (6) and (8) and imposing the condition that $\tau_3>\tau_1$, in order to get rid of the absolute value signs, it turns out that the distortion $D$ increases linearly with $\tau$ and thus the minimum allowable $\tau$ is selected. Since $\tau_3>\tau_1$, then $\tau>1/(f_H+f_L)$ resulting in the optimum value $$\tau=1/(f_H+f_L). \qquad (1)$$

Similarly, using equations (6) and (8) but letting $\tau_1>\tau_3$, the distortion $D$ decreases linearly with increasing $\tau$ in the region of interest $\tau>1/2f_H$. Thus, the maximum allowable value of $\tau$ is chosen yielding again $$\tau=1/f_H+f_L. \qquad (1)$$

Substituting the expression for $\tau$ in equation (1) into equation (13) yields the following expression for distortion:

$$D=B/2(f_H+f_L). \qquad (14)$$

Figure 3C:
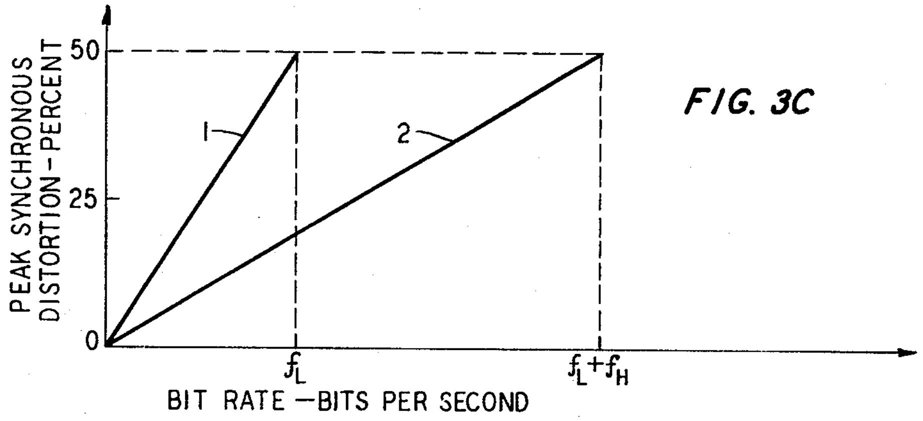
FIG. 3C shows the relationship between peak synchronous distortion and bit rate for two demodulating schemes.

A plot of this expression is given as curve 2 of FIG. 3C. Curve 1 of FIG. 3C shows the relation between distortion and bit rate for the prior art detector of the Calfee patent which was discussed before. A comparison of curves 1 and 2 shows an improvement of almost two-to-one in bit rate, for the same synchronous distortion. An upper limit on the bit rate can be determined using the criterion that when the distortion equals 50 percent it is impossible to demodulate synchronously without errors. Thus, from equation (14) the maximum bit rate is $B$ max $=f_H+f_L$.

Figure 3D:
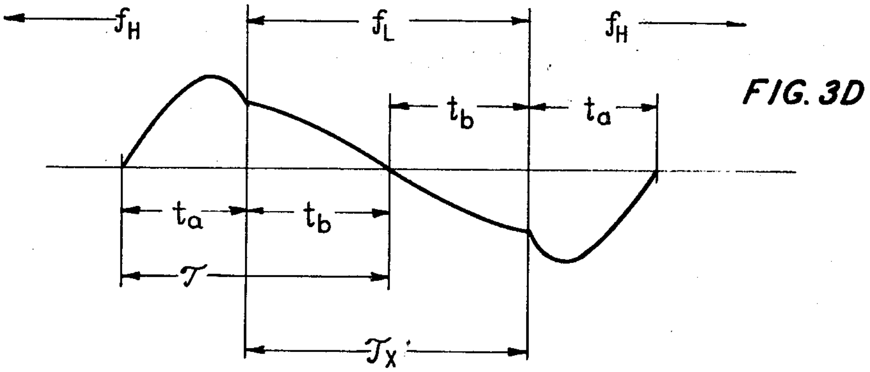
FIG. 3D shows a worst case sequence in which there exists an ambiguity as to the frequency being received.

A similar expression for the maximum bit rate can be calculated with reference to FIG. 3D. The ability to determine a change in frequency is obviously diminished as the bit rate increases. FIG. 3D shows a worst case condition in which the ability to determine a change in frequency is marginal. Recall decision (c) above. The interval between zero crossings is assumed to be $\tau$. An expression for the minimum $\tau$ will be determined in order to know whether $f_L$ was received. From FIG. 3D, expressions similar to those of equations (2) and (3) can be had. Also, knowing that $\tau_X=2t_b$ yields $$B \text{ max} = 1/\tau_X = 1/2t_b = f_H + f_L, \qquad (15)$$

which is the same as that derived above. Thus, if $f_H$=2,100 Hz. and $f_L$=1,300 Hz. the maximum bit rate is 3,400 bits/second. It is of interest to note that the synchronous distortion is exactly 50 percent at the maximum bit rate.

Limitations that prohibit realization of this upper bound are the inherent synchronous distortion, channel bandwidth, delay distortion, and noise. However, additional circuitry connected to digital detector 19 or business machine 18 of FIG. 1 can be used to calculate the exact times of data transitions thereby removing the inherent distortion introduced by the digital detector. For instance, a phase-locked loop can be used to obtain timing information for sampling the output of digital detector 19 at the center of of each bit. This discussion, of course, assumes synchronous transmission.

The formation of the demodulated output data is now explained with reference to FIGS. 1B, 2A, and 4. It will be assumed that $f_L$=1,300 Hz., $f_H$=2,100 Hz., and $B$=650 bits/second. From this information it can be concluded that $\tau$=294 microseconds, $B$ max =3,400 bits/seocnd, and that the peak synchronous distortion is approximately 7 percent. The timing intervals of monopulsers 51 and 52 are both chosen as $\tau/2$ or 147 microseconds.

Figure 4:
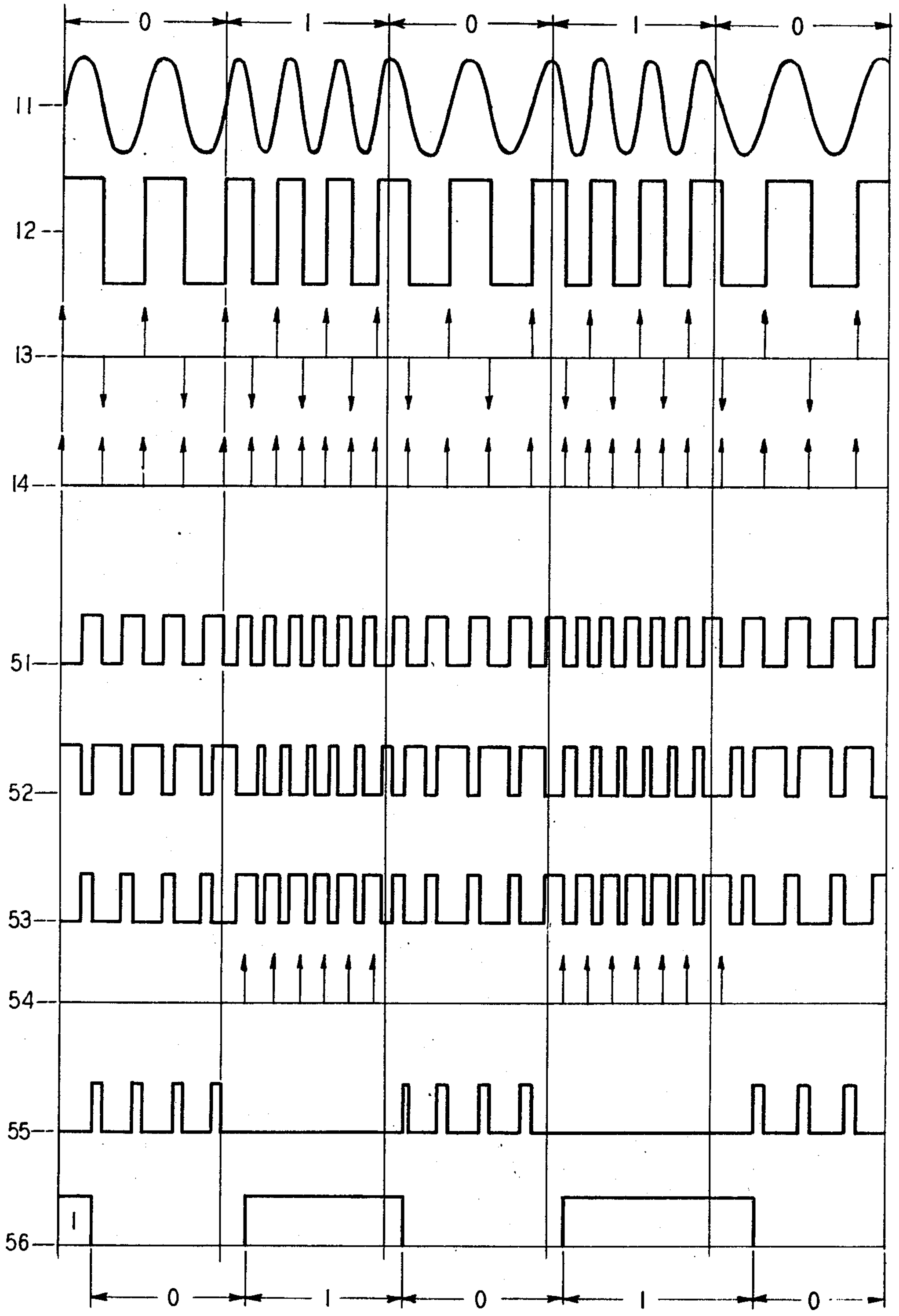
FIG. 4 is a waveform diagram explanatory of typical operating conditions of the arrangements of FIGS. 1B and 2A.

Attention is now called to FIG. 4 which illustrates a typical binary frequency modulated signal which, for the interval illustrated, represents successive bits of "0," "1," "0," "1," and "0". It is assumed that a binary "0" is represented by a signal having the frequency $f_L$ and that a binary "1" is represented by a signal having the frequency $f_H$.

The output of receiver 11, line 11 of FIG. 4, is sent into limiter 12 wherein the FSK wave is squared, yielding line 12 of FIG. 4. Thereafter, the output of limiter 12 serves as the input to differentiator 13 yielding alternate positive and negative pulses at consecutive zero crossings as shown on line 13. Next, the alternating pulses are passed through rectifier 14 to invert all the negative pulses yielding unidirectional pulses corresponding to the zero crossings of the received wave as shown on line 14. The rectified pulses are then sent to digital detector 19.

The rectified pulses enter monopulser 51 of FIG. 2A. Upon receiving a pulse, monopulser 51 is triggered OFF during the interval between $t_1$ and $t_2$ as shown in FIG. 2B. For the given series of unidirectional pulses, line 14 of FIG. 4, the output timing waves of monopulser 51 appear on line 51 of FIG. 4. The output of monopulser 51 then serves as the input to monopulser 52, yielding the waveform shown on line 52 of FIG. 4. When monopulser 51 goes back ON, monopulser 52 is triggered OFF during the interval between $t_2$ and $t_3$ as shown in FIG. 2B. The output of monopulser 52 is inverted in gate 53, resulting in line 53 of FIG. 4.

Recall the basic comparison operation of digital detector 19: If the interval between two consecutive zero crossings is less than $\tau$, then it is assumed that $f_H$ is being received; while if the interval is greater than $\tau$, it is assumed that $f_L$ is being received. Referring to FIG. 4, if the interval between zero crossings is less than 294 microseconds, then the unidirectional pulses, line 14 of FIG. 4, and the inverted output of monopulser 52, line 53, serve to open AND gate 54 resulting in the pulse waveform shown on line 54. However, if the interval between zero crossings is greater than 294 microseconds, then the outputs of monopulsers 51 and 52 serve to open AND gate 55 resulting in the square waveform on line 55. Finally, the output of AND gate 54 serves as the set input to flip-flop 56 and the output of AND gate 55 serves as the reset input resulting in the demodulated output waveform of line 56. There is a delay between the input wave the input wave of line 11 and the actual demodulated digits. The limits of this delay are shown in FIG. 3B, and are defined as $\tau_1$ and $\tau_2$.

Figure 5:
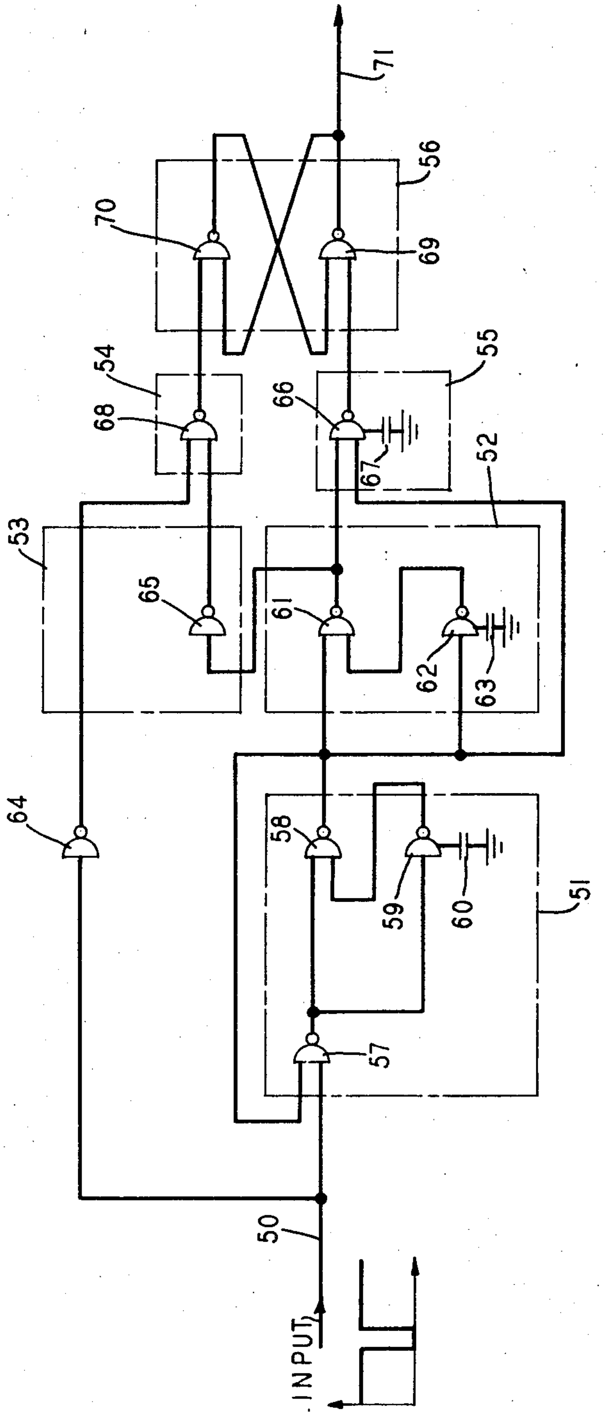
FIG. 5 is a detailed embodiment of a digital detector according to this invention employing integrated circuit logic.

FIG. 5 illustrates a specific embodiment of a digital detector according to this invention comprising integrated circuit NAND gates. Referring to FIG. 2A, it can be seen that NAND gates 57, 58, 59, and capacitor 60 comprise monopulser 51, NAND gates 61, 62, and capacitor 63 comprise monopulser 52, NAND gate 65 is equivalent to inverter 53, NAND gate 66 and capacitor 67 comprise AND gate 55, NAND gate 68 is equivalent to AND gate 54, and NAND gates 69 and 70 comprise flip-flop 56. Capacitors 60 and 63 are chosen to yield the desired timing waveforms for monopulsers 51 and 52. Capacitor 67 serves as a digital filter or delay and serves to eliminate multiplexing noise. NAND gate 64 is used merely to correct for the sign of the input pulse. The detailed operation of these elements will not be discussed herein as they are well known in the art.

While the arrangement according to this invention for digitally demodulating an asynchronous continuous phase binary FSK wave has been described in terms of a specific illustrative embodiment, it will be apparent to one skilled in the art that many modifications are possible within the spirit and scope of the disclosed principle.

What is claimed is:

1. A demodulator for deriving digital information from a continuous-phase, frequency-shift-modulated wave containing high and low frequencies representing respective complementary data bits comprising means for receiving said modulated wave, means for generating unidirectional pulses corresponding to the zero crossings of said received wave, and digital detection means responsive to said unidirectional pulses for producing said complementary data bits as determined by a comparison of successive zero-crossing intervals with an optimum threshold interval defined as the reciprocal of the sum of said high and low frequencies, said digital means producing said data bits as said zero-crossing intervals are greater or less than said optimum threshold interval.

2. The demodulator of claim 1 wherein said digital means further comprises timing means responsive to said unidirectional pulses for producing uniform pulses each having a duration equal to the reciprocal of the sum of said high and low frequencies, and logic means jointly responsive to said unidirectional pulses and said uniform pulses for producing said complementary data bits.

3. The demodulator of claim 2 wherein said timing means further comprises first monostable means responsive to said unidirectional pulses for producing a first series of uniform pulses each having a duration equal to less than one-half the reciprocal of said high frequency and second monostable means responsive to the termination of each of said first series of pulses for producing a second series of uniform pulses each having a duration equal to the difference between the duration of each of said first series of pulses and the reciprocal of the sum of said high and low frequencies.

4. The demodulator of claim 1 wherein said generating means comprises in tandem a limiter, a differentiator, and a rectifier.

5. A demodulator for deriving digital information from a continuous-phase, frequency-shift-modulated wave containing high and low frequencies representing respective complementary data bits comprising in combination means for receiving said modulated wave, a limiter for squaring said modulated wave, a differentiator of said squared wave for producing alternate positive and negative pulses, a rectifier of said alternate pulses for producing unidirectional pulses corresponding to the zero crossings of said received wave, a first monopulser responsive to said unidirectional pulses for producing a first series of uniform pulses each having a duration equal to less than one-half the reciprocal of said high frequency, a second monopulser responsive to said first series of pulses for producing a second series of pulses each having a duration equal to the difference between the reciprocal of the sum of said high and low frequencies and the duration of each of said first series of pulses, an inverter responsive to said second series of pulses for producing the inverse thereof, a first AND gate jointly responsive to said unidirectional pulses and to said inverse pulses, a second AND gate jointly responsive to said first and second series of pulses and a flip-flop jointly controlled by said first and second AND gates for producing said complementary data bits.

6. A demodulator for deriving digital information from a continuous-phase, frequency-shift-modulated wave containing high and low frequencies representing respective complementary data bits comprising means for receiving said modulated wave, means for generating unidirectional pulses corresponding to the zero crossings of said received wave, means for comparing the time interval between consecutive ones of said unidirectional pulses with an optimum threshold interval defined as the reciprocal of the sum of said high and low frequencies, and logic means controlled by said comparing means for producing either of said complementary data bits as the time interval between consecutive ones of said unidirectional pulses is greater or less than said optimum threshold interval.